US009497935B2

United States Patent
Risser

(10) Patent No.: US 9,497,935 B2
(45) Date of Patent: Nov. 22, 2016

(54) MODULAR TRANSPORT SYSTEM FOR ANIMALS

(75) Inventor: Philip E. Risser, Leola, PA (US)

(73) Assignee: Valco Companies, Inc., New Holland, PA (US)

( * ) Notice: Subject to any disclaimer, the term of this patent is extended or adjusted under 35 U.S.C. 154(b) by 4 days.

(21) Appl. No.: 13/590,453

(22) Filed: Aug. 21, 2012

(65) Prior Publication Data

US 2013/0047930 A1 Feb. 28, 2013

Related U.S. Application Data

(60) Provisional application No. 61/525,944, filed on Aug. 22, 2011.

(51) Int. Cl.
| | | |
|---|---|---|
| *A01K 31/06* | (2006.01) | |
| *A01K 31/00* | (2006.01) | |
| *A01K 31/04* | (2006.01) | |
| *A01K 45/00* | (2006.01) | |

(52) U.S. Cl.
CPC ........... *A01K 31/005* (2013.01); *A01K 31/007* (2013.01); *A01K 31/04* (2013.01); *A01K 45/005* (2013.01)

(58) Field of Classification Search
CPC .......................... A01K 1/0236; A01K 31/002
USPC ....... 119/401, 402, 437, 439, 440, 441, 449, 119/450, 453, 455, 457, 487, 488, 489, 408, 119/409, 456; 198/465.1, 465.2, 347.1, 580
IPC .................................... A01K 1/02, 31/06, 31/07
See application file for complete search history.

(56) References Cited

U.S. PATENT DOCUMENTS

| | | | | |
|---|---|---|---|---|
| 2,257,734 A | * | 10/1941 | Cornell ................. | A01K 31/17 119/437 |
| 3,045,612 A | * | 7/1962 | Byrnes .................. | A01K 31/17 104/173.1 |
| 3,776,191 A | * | 12/1973 | Murto .......................... | 119/457 |
| 3,776,395 A | * | 12/1973 | Lingg et al. ............... | 414/788.8 |
| 3,789,802 A | * | 2/1974 | Conley ....................... | 119/337 |
| 3,797,460 A | * | 3/1974 | Blankenship ........ | A01K 45/005 119/455 |
| 3,867,903 A | * | 2/1975 | Fleshman ................... | 119/455 |
| 4,123,991 A | | 11/1978 | Kinrade | |
| 4,292,928 A | * | 10/1981 | Kopylov ............... | A01K 31/005 119/453 |
| 4,365,591 A | | 12/1982 | Wills et al. | |
| 4,430,960 A | | 2/1984 | Nagel et al. | |

(Continued)

FOREIGN PATENT DOCUMENTS

EP 0058030 A2 8/1982

*Primary Examiner* — Lisa Tsang
(74) *Attorney, Agent, or Firm* — Caesar Rivise, PC

(57) ABSTRACT

A system for handling animals includes: a movable series of modules to contain the animals; a plurality of stations at a first location in a facility, at least one station to communicate with at least one module, whereby substances may be dispensed to a module from a station and/or materials may be collected from a module by a station; a first transporter for transporting the series in a first direction and to transport a module from a second location in the facility to a first position between the first and second locations; a second transporter for transporting the series in a second direction and to transport a module from the first position to a second position nearer the stations; a source of a first motive force to move modules on the first transporter; and a source of a second motive force to move modules to the second transporter.

25 Claims, 11 Drawing Sheets

(56) References Cited

U.S. PATENT DOCUMENTS

| | | | |
|---|---|---|---|
| RE31,556 E | 4/1984 | Buchanan | |
| 4,448,150 A | 5/1984 | Catsimpoolas | |
| 4,480,588 A * | 11/1984 | Holladay et al. | 119/455 |
| 4,553,406 A * | 11/1985 | Richelli et al. | 62/341 |
| 4,699,583 A * | 10/1987 | Grigoli et al. | 425/261 |
| 4,892,062 A | 1/1990 | Elford | |
| 5,099,795 A | 3/1992 | Nagel | |
| 5,299,680 A * | 4/1994 | Rhodes | 198/465.2 |
| 5,407,316 A * | 4/1995 | Coatta et al. | 414/787 |
| 5,540,319 A * | 7/1996 | Orisaka | B61B 13/127 198/465.2 |
| 5,950,565 A | 9/1999 | Guyot | |
| 6,234,114 B1 * | 5/2001 | Dyer | 119/334 |
| 6,623,232 B2 * | 9/2003 | Cattaruzzi | 414/398 |
| 6,854,583 B1 * | 2/2005 | Horn | 198/348 |
| 7,509,923 B2 | 3/2009 | Adams et al. | |
| 7,594,481 B2 | 9/2009 | Carter et al. | |
| 2006/0201785 A1 * | 9/2006 | Moeller | 198/618 |
| 2009/0050444 A1 * | 2/2009 | Yuyama et al. | 198/347.1 |

* cited by examiner

MODULAR TRANSPORT SYSTEM FOR ANIMALS

CROSS-REFERENCE TO RELATED APPLICATIONS

This application claims priority benefit of U.S. provisional Patent Application No. 61/525,944, filed Aug. 22, 2011, titled Animal Housing System, the entire disclosure of which is hereby expressly incorporated by reference herein.

BACKGROUND

Applicant's system relates generally to housing systems for animals, and more particularly to housing systems for raising poultry or other fowl.

The domestication of animals for the beneficial use of human needs has led to the use of man-made animal housing structures. These animal housing structures are used to protect livestock from the elements and from predators, and to enable the efficient care and enhanced productivity of the livestock.

As mechanization and computerization have become available in agriculture, animal housing has evolved to enable improvements in the efficiency of care and the level of productivity. An increasingly important aspect of animal housing is the provision of humane care and relative freedom of movement.

Important advancements have been made in animal housing systems through the automation of water delivery systems, feed delivery systems, air delivery systems, product removal systems and waste products removal systems. Examples of these include regulated water pressure in conjunction with nipple drinkers for chickens, chain or auger feed delivery for chickens and hogs, fans or wall curtains for the supply of fresh air and the removal of stale air, egg belts for layer chicken egg collection, and scrapers or manure belts for the removal of hog and chicken manure, respectively. All of these systems have been further enhanced by the use of automatic control systems to improve reliability, efficiency and productivity.

In general, advances have been achieved in animal housing systems by more efficiently delivering necessary animal provisions (such as water, feed and air) to the animals and by more efficiently removing useful products (such as eggs) or waste products (such as manure and stale air) from the animals.

As these advances have occurred, the complexity and therefore the capital cost and maintenance requirements have increased. Using high density layer houses as an example, there are many mechanical components required such as motors, gearboxes, pulleys, flat belts, chains and augers used to either distribute material to the chickens throughout the house or to collect material from the chickens throughout the house.

Recently, the provision of more humane care and allowance for freedom of movement of chickens has become important to consumers and, therefore, producers of eggs and other poultry products. Equipment such as community nests, aviaries, colony housing and enriched cages have been developed to provide for these additional requirements. All housing systems still require the use of multiple systems to deliver provisions and remove products and waste products with the resulting high complexity, capital cost and maintenance requirements.

BRIEF SUMMARY

There are various aspects of Applicant's systems and methods, and there are many variations of each aspect.

One aspect is a system for handling a plurality of animals in a facility. The system includes six elements. The first element is at least one movable linear or curvilinear series of modules adapted to contain the plurality of animals in a plurality of movable modules in the series of modules. The second element is a plurality of stations in a first location in the facility. At least one of these stations is adapted to communicate with at least one module in the series of modules, whereby at least one substance may be dispensed to the at least one module from the at least one station and/or at least one material may be collected from the at least one module by the at least one station. The third element is a first transporter for transporting at least part of the series of modules in a first direction. The first transporter is adapted to transport at least one module in a series of modules from a second location in the facility to a first position in between the first location and the second location. The fourth element is a second transporter for transporting at least a portion of the series of modules in a second direction. The second transporter is adapted to transport the at least one module in the series of modules from the first position to a second position nearer the plurality of stations whereby at least one module in the series of modules is adjacent at least one of the stations. The fifth element is a source of first motive force adapted to move at least part of the series of modules on the first transporter. The sixth element is a source of a second motive force adapted to move at least a portion of the series of modules on the second transporter.

In a first variation of the system, the source of the first motive force and the source of the second motive force have a common source of motive force.

In a second variation of the system, the source of the first motive force is at least one first actuator. In a third variation of the system, the source of the second motive force is at least one second actuator.

In a fourth variation of the system, the first transporter includes at least one first track or first pair of tracks. In a fifth variation of the system, the second transporter includes at least one second track or second pair of tracks. In a variant of the fifth variation, the second transporter includes at least one other track or other pair of tracks positioned at an angle to the at least one second track or second pair of tracks.

In a sixth variation of the system, the second transporter includes a movable platform.

In a seventh variation of the system, the first transporter includes a first apparatus selected from a group including at least one conveyor, track, wheel, caster, rolling device, and sliding device. In an eighth variation of the system, the second transporter includes a second apparatus selected from a group including at least one conveyor, track, wheel, caster, rolling device, lifting device, and sliding device.

In a ninth variation of the system, at least some of the modules in the series of modules are movably connected to at least one of at least part of the first transporter and at least part of the second transporter.

In a tenth variation of the system, at least one of the plurality of stations is adapted to dispense an amount of at least one of a food, medicine, supplement, fluid, and other substances for the plurality of animals to at least one of the modules positioned adjacent the at least one of the plurality of stations.

In an eleventh variation of the system, at least one of the plurality of stations is adapted to collect an amount of at least one of a product, waste, and other materials from at least one of the modules positioned adjacent the at least one of the plurality of stations.

In a twelfth variation of the system, at least one of the modules includes a fluid supply assembly adapted to provide water or other fluids to at least one animal contained in the module.

In a thirteenth variation of the system, at least part of the first transporter is on or connected to a floor of the facility. In a fourteenth variation of the system, at least part of the first transporter is on or connected to a ceiling or a wall of the facility.

In another variation of the system, at least one of the modules has multiple levels. In yet another variation of the system, at least some of the first motive force is transferred from a module to an adjacent module or another module in the series of modules. In still yet another variation of the system, at least a portion of the second transporter is common with at least a portion of the first transporter.

Another aspect is a system for handling a plurality of animals in a facility, which system has nine elements. The first element is a first row of a movable linear series of modules adapted to contain some of the plurality of animals in a plurality of movable modules in the first row of the movable linear series of modules. The second element is a second row of the movable linear series of modules adapted to contain some other of the plurality of animals in a plurality of movable modules in the second row of the movable linear series of modules. The second row is substantially parallel to the first row and each of the first row and the second row have a first end and a second end opposite the first end. The third element is a plurality of stations at a first location in the facility. At least one of the stations is adjacent the second end of the second row and is adapted to communicate with at least one module in the movable linear series of modules. At least one substance may be dispensed to the at least one module from the at least one station and/or at least one material may be collected from the at least module by the at least one station. The fourth element is a first pair of tracks for transporting the first row of the movable linear series of modules in a first direction. The first pair of tracks is adapted to transport at least one module in the series of modules from a second location in the facility near the first end of the first row to a first position near the second end of the first row. The fifth element is a source of a first motive force adapted to move the first row of the movable linear series of modules on the first pair of tracks. The sixth element is a movable platform near the second end of the first row and the second end of the second row. The movable platform is adapted to transport the movable module at the second end of the first row to the second end of the second row in a second direction substantially perpendicular to the first direction. The movable platform is mounted on a second pair of tracks substantially perpendicular to the first pair of tracks. The seventh element is a source of a second motive force adapted to move the movable module on the movable platform from the second end of the first row to the second end of the second row. The eighth element is a third pair of tracks for transporting the second row of the movable linear series of modules in a second direction opposite the first direction. The third pair of tracks is substantially parallel to the first pair of tracks. The ninth element is a source of third motive force adapted to move the second row of the movable linear series of modules on the third pair of tracks in a direction opposite the first direction.

In a first variation of this system, at least one of the plurality of stations is adapted to dispense an amount of at least one of a food, medicine, supplement, fluid, and other substances for the of animals to at least one of the modules positioned adjacent the at least one of the plurality of stations.

In a second variation of this system, at least one of the plurality of stations is adapted to collect an amount of at least one of a product, waste, and other materials from at least one of the modules positioned adjacent the at least one of the plurality of stations.

Another aspect is a method for handling a plurality of animals in a facility. The method includes six steps. The first step is to provide at least one movable linear or curvilinear series of modules adapted to contain the plurality of animals in a plurality of movable modules in the series of modules. The second step is to provide a plurality of stations at a first location in the facility, at least one of the stations adapted to communicate with at least one module in the series of modules, whereby at least one substance may be dispensed to the at least one module from the at least one station and/or at least one material may be collected from the at least one module by the at least one station. The third step is to apply a first motive force to move at least part of the series of modules on a first transporter. The fourth step is to transport on the first transporter at least part of the series of modules in a first direction, whereby at least one module in the series of modules is transported from a second location in the facility to a first position between the first location and the second location. The fifth step is to apply a second motive force to move at least a portion of the series of modules on a second transporter. The sixth step is to transport on the second transporter at least a portion of the series of modules in a second direction, whereby the at least one module in the series of modules is transported from the first position to a second position nearer the plurality of stations so that at least one module in the series of modules in adjacent at least one of the stations.

A first variation of the method includes an additional step of dispensing to the at least one module from the at least one station an amount of at least one of a food, medicine, supplement, food, and other substances for the plurality of animals. A second variation of the method includes the additional step of collecting from the at least one module by the at least one station an amount of at least one of a product, waste, and other materials.

In another aspect there is provided a system for holding and raising livestock, e.g., chickens or other fowl, for production of food. The system includes a plurality of modules, each of which is arranged to hold therein at least one livestock animal (preferably plural livestock animals). The modules are disposed on a conveyor system, e.g., on enclosed tracks in which wheels of the modules are located, for moving the modules (e.g., under the force provided by extendable actuators) to various fixed location stations at which various functions, e.g., provisioning, waste removal, etc., for the livestock may be performed.

BRIEF DESCRIPTION OF THE DRAWINGS

Applicant's system will described by way of example with reference to the accompanying drawings, in which.

DETAILED DESCRIPTION

Figure 1:
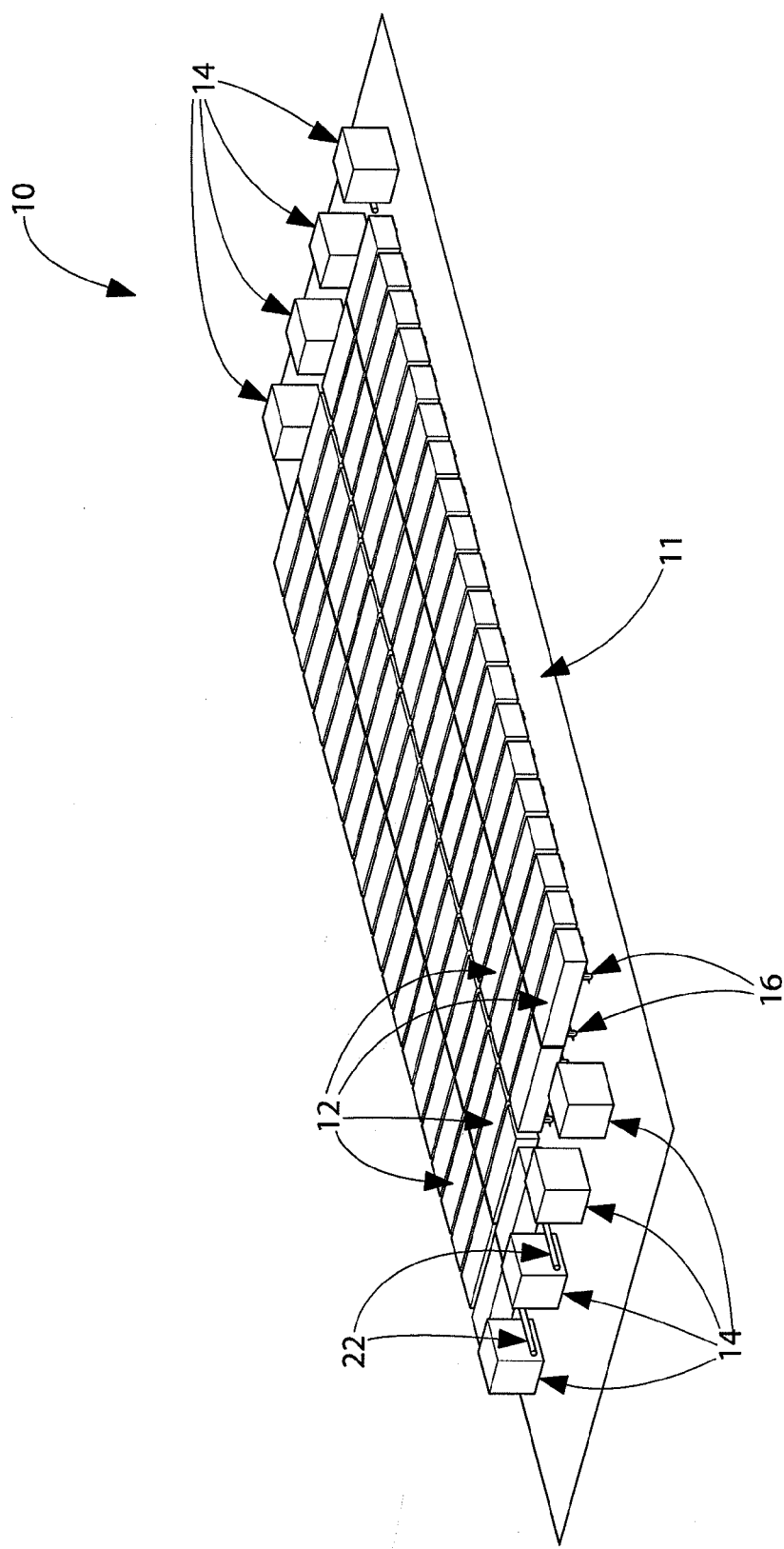
FIG. 1 is an isometric view of an exemplary embodiment of Applicant's system for use in the poultry industry making use of plural modules which are moved on conveyor systems to various stations.

Referring now to the various figures of the drawings wherein like reference numerals refer to like parts, there is shown in FIG. 1 one embodiment of Applicant's system 10. The system 10 is arranged to be located in a building structure (only the floor 11 of which is shown). Although the system 10 is shown and described for accommodating poultry, it can be readily modified for other types of livestock and animals.

The exemplary system 10 shown and described hereinafter enables material handling for poultry housing structures, which improves the efficiency of provision (e.g., food, water, etc.) delivery and product (e.g., egg) removal, as well as providing opportunities for further production advances not practical with current poultry housing systems. To that end the system makes use of a movable series of modules 12 adapted to move inside the housing structure. This allows feed delivery, water supply, product collection, and waste product collection to occur at one or more stations 14 (e.g., fixed stations) in the housing structure. In other words, the animals (e.g., chickens) are moved to the distribution and collection points rather than having these functions occur at multiple locations throughout the housing structure.

One advantage of this system 10 is the lower equipment cost that results from the lower mechanical complexity. Rather than having multiple separate distribution and collection systems for each provision or product that extend throughout an entire facility, distribution and collection can occur at only one or a limited number of stations 14 in the facility. With feed loaded into feeders of the modules at only one or a limited number of stations 14, there is no need for an auger or chain system to run throughout the housing structure. Similarly, with water being loaded into water storage and dispensing devices of the modules 12 at only one or a limited number of stations 14, there is no need for water piping to run throughout the housing structure. Moreover, with the modules 12 being moved around the housing structure, collection of useful product (such as eggs) can occur at only one station 14, so that a collection system throughout the housing structure is not required. Similarly, the collection of waste products (such as manure) can occur at only one or a limited number of stations 14, making it unnecessary to run a collection system throughout the housing structure.

Further, because the modules 12 are moved around the housing structure, there is no need for human access aisles (between cages, for example). This feature results in higher chicken or other fowl numbers in a housing structure or an increase in the amount of space allotted to each individual chicken or both, thereby resulting in further economies.

The handling of chickens or other fowl for purposes of veterinary care, removal from the housing system for marketing, or other special handling can be automated with this system 10 because all chickens or other fowl can be brought to a designated area at which they could be removed from their housing module 12. For example, chickens raised as broilers or pullets can be removed automatically when they are of the proper age or weight as their module 12 passes by a designated area or station 14 equipped with a single automatic machine. Dead fowl removal could also be automated.

The system 10 enables a multitude of further advancements that would be difficult or impossible with current poultry housing systems. For example, the use of housing modules 12 that are moved around the housing structure, with groups of chickens or other fowl kept in a module 12, allows much closer monitoring of production parameters of small groups. Every time a given module 12 passes by the feed distribution point, it can be identified automatically by appropriate equipment and the feed consumed by the group of chickens or other fowl in that module over the period of time elapsed since the last pass can be measured, recorded, and analyzed. This type of information can also be collected for water usage, product quantity, waste product quantity, fowl weight gain or loss, etc. Analysis of these data can aid in the early detection of production or health problems, better management of nutrient supply, and forecasting of fowl or egg supply. The modules 12 also can be managed individually, with different feed rations supplied depending on the age, weight, or production of the chickens or other fowl in the module 12.

Another potential advancement made possible by Applicant's system 10 is the provision of some "outside environment" time. For example, a housing module 12 could be moved not only around the housing structure, but also could pass through a wall or doorway to spend a controlled amount of time "outside" the housing structure. Of course, the design of the housing structure and the "outside" area could limit the chance of any negative effects of the "outside" time, such as disease or exposure to the elements.

Referring now to FIG. 1 it can be seen that Applicant's system 10 includes a plurality of animal housing modules 12, a conveyor system (described later) for the modules 12, and a plurality of stations 14 at which some activity relating to the animals can be conducted. The entire system 10 may be located within a housing building (not shown). In the embodiment shown, the modules 12 are arranged to house plural fowl, e.g., chickens, therein and the modules 12 are mounted on tracks 16 of the conveyor system to carry the modules 12 to the stations 14. It is at these stations 14 that different activities relating to the chickens can be accomplished, e.g., the birds fed at a feeding or provisioning station 14, eggs removed at an egg removal station 14, waste removed at a waste removal station 14, etc., as will be described in detail later. In the embodiment shown in FIGS.

1 and 3, the stations 14 for accomplishing those various tasks are located at the ends of the tracks 16. While the stations 14 are designated by the common reference numeral 14 in the interest of simplicity, the stations 14 have different functions, e.g., there is a provision station 14, a waste removal station 14, an egg removal station 14, etc.

Figure 2A:
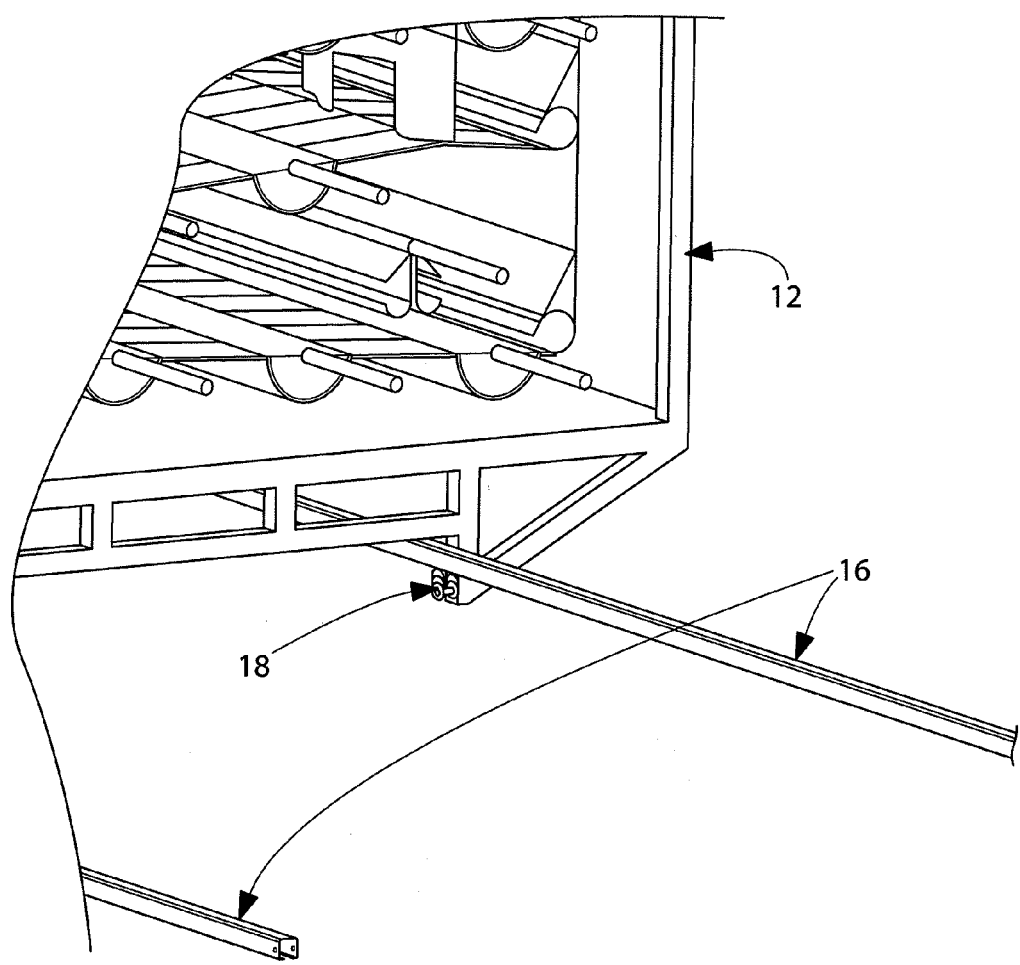
FIG. 2A is an enlarged isometric view of one portion of an exemplary module used in the system shown in FIG. 1.
Figure 2B:
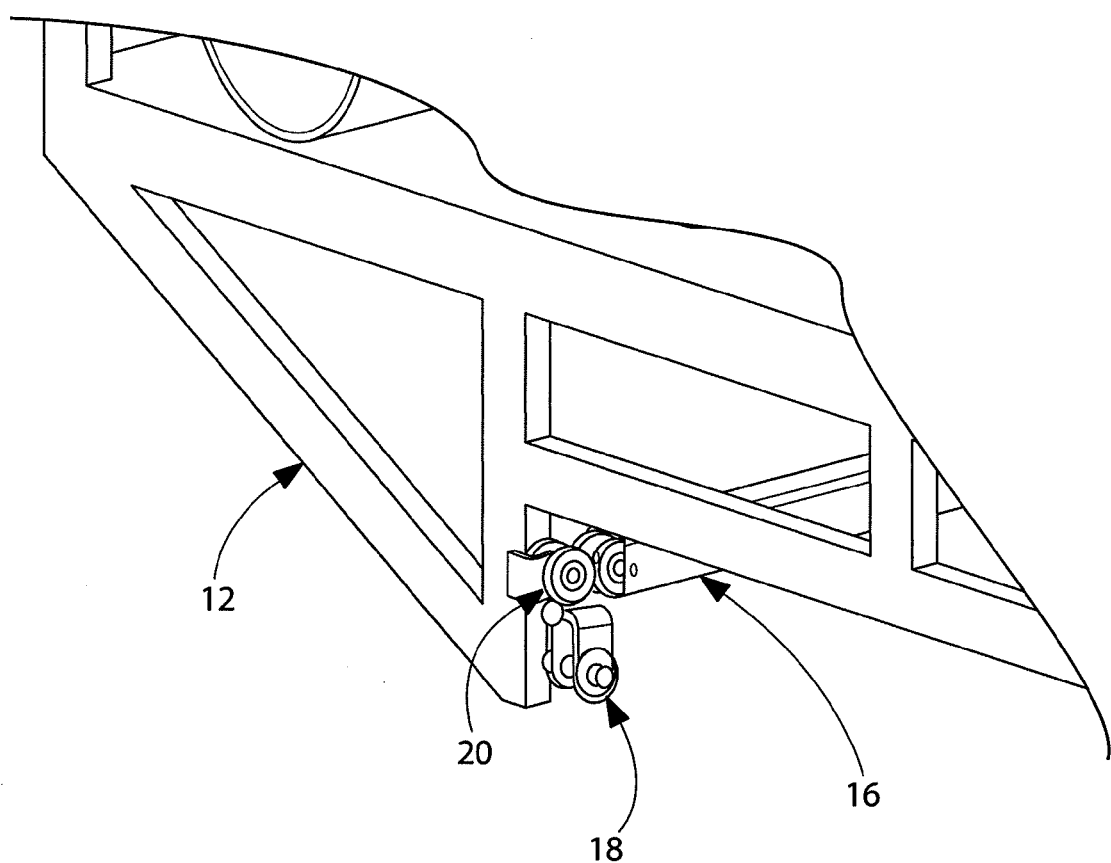
FIG. 2B is an enlarged isometric view of a portion of the module shown in FIG. 1A, in which more details of the various components making up the module are shown.

Referring to FIGS. 2A and 2B, details of a typical poultry module 12 will now be described. As shown, the module 12 includes an enclosure for holding a group of chickens or other fowl (not shown). The module 12 may be single level or multi-level (as shown). Multi-level modules 12 could allow the fowl to move from level to level, if desired. Access to a single level or multiple levels could depend on the use of the chickens or other fowl, such as the production of eggs or meat.

In the illustrated embodiment, the support of the modules 12 as the modules 12 move around the housing structure is accomplished by means of carriers 18 with rolling wheels 20 within an enclosed track 16 under the modules 12 that supports the weight of the modules 12. The modules 12 are guided by having the carriers 18 constrained laterally by the track 16. Alternatively, the modules 12 may be supported by wheels or casters rolling on the floor or on an overhead support structure of the building in which the system 10 is located. The rolling devices could be unguided and another device on the module could be guided. The support of the modules 12 may also be accomplished by means of sliding devices that could include low friction materials to reduce the draft forces required to effect movement of the modules 12. These sliding devices could be located above or below the module 12 and could serve as guidance devices or other devices could be utilized for guidance.

In the illustrated embodiment, movement of the modules 12 along the track 16 is effected by reciprocating actuators 22 forming a portion of the conveyor system. The actuators 22 may be hydraulic cylinders or electric-driven ball screws or other actuation devices to produce an indexing motion. The reciprocating devices push the modules 12 in one direction of its travel. Then the actuators 22 return empty, causing no motion but readying for the pushing of the next module 12 or group of modules 12 once those move into position. In this embodiment reciprocating actuators 22 used to provide motive force for the movement of modules 12 along the length of the building are located at two opposite corners of the housing structure. As the reciprocating actuators 22 push directly on modules 12, the pushed modules 12 in turn push the adjacent modules 12 and so on down the row of modules 12. In this way, one reciprocating actuator 22 can push an entire row of modules 12. Ideally, the reciprocating actuator 22 is placed at the same height as the track 16, but could be placed at any of several heights. A manual option could be provided to effect motion during power failures. The reciprocating actuator 22 could use electric, hydraulic, pneumatic, or mechanical power sources to produce motion. A single reciprocating actuator 22 could supply the motive force for the indexing of the entire system. Alternatively, multiple reciprocation actuators 22 could be positioned throughout the housing structure to effect motion as required.

As an alternate to the actuators 22 of the illustrated embodiment, the motive force required to move the modules 12 could be supplied by a single or multiple conveyors equipped with devices that engage the modules 12 and cause them to move along with the conveyor. Such a conveyor could provide either continuous or indexing motion and could be located above, below, or beside the modules 12. The conveyor could engage a single module 12 per row of modules 12 with the engaged module 12 then pushing the modules 12 ahead of it, or the conveyor could engage multiple modules 12 within a row of modules 12.

Figure 3:
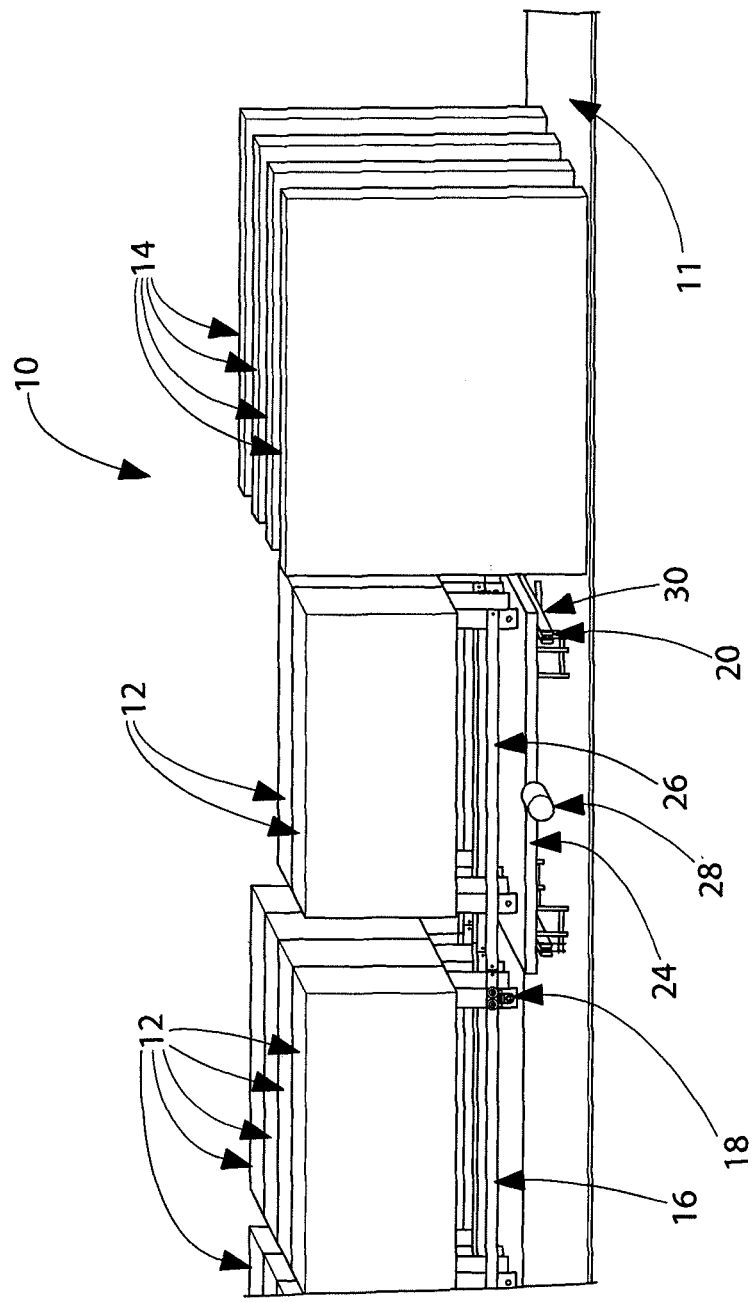
FIG. 3 is an isometric view of a portion of the system shown in FIG. 1 showing the transport system for moving the modules of the system to the various stations.

In the illustrated embodiment, the enclosed track 16 runs the length of the housing building, terminating where modules 12 must move laterally to the opposite side of the housing for movement in the reverse direction. As best seen in FIG. 3, the lateral motion of the modules 12 is accomplished by use of a reciprocating platform 24 fitted with a short section of enclosed track 26. As a module 12 reaches the platform 24, its carriers 18 roll out of the enclosed track 16 which runs the length of the housing building and roll into the short section of track 26 on the platform 24. Modules 12 are prevented from rolling out of any track unless the mating track is in alignment. The platform 24 can then move laterally with the module(s) 12, stopping as needed for the supply of provisions or the removal of products or waste products. The actuation of the platform 24 is effected by a reciprocating actuator 28. The platform 24 itself is supported by wheels 20 rolling in a track 30. Alternatively, the support of the modules 12 could utilize wheels for the length of the housing structure and sliding (e.g., sled) devices for movement across the width of the housing structure. Movement across the width of the housing structure could also be accomplished by a friction drive wheel or by a device that would lift the module(s) 12 off its regular support wheels and carry it across the width, then set it down on the regular support wheels again. The sled itself could be supported by wheels rolling on the floor.

In the illustrated embodiment, the modules 12 are arranged to provide for a single row traveling in each direction or two rows traveling in each direction side by side. The number of rows of modules 12 in the housing structure depends on the width of the housing building and the size of the modules 12. If it is desired to manage the birds in smaller groups, the modules 12 could be sized such that more than two rows of modules 12 would be utilized in each direction of travel. Alternatively, the path of motion of the modules 12 could follow the perimeter of the housing structure or follow a serpentine path within the structure. The modules 12 can move in groups or singly along the path. The modules 12 can be separate entities that push or pull the adjacent modules 12 or can be flexibly linked to allow movement around the housing structure on a curvilinear path.

In the illustrated embodiment, the control of motion of the modules 12 is established by a programmable controller (e.g., a microprocessor and associated equipment—not shown) forming a portion of the system 10. The programmable control device allows for variations in the motion of the modules 12 based on any variable desired, such as the type of animal, age of the animal, productivity of the animal, environmental variables, time of day, stage of production, operator preference, etc. The speed of the reciprocating actuator 22 or conveyor can be varied, as well as the duration of the stop time between indexing, if used. Alternatively, the control of the motion of the modules 12 can be set by the mechanical design of the housing system or can be controlled electrically without a programmable interface.

Figure 4A:
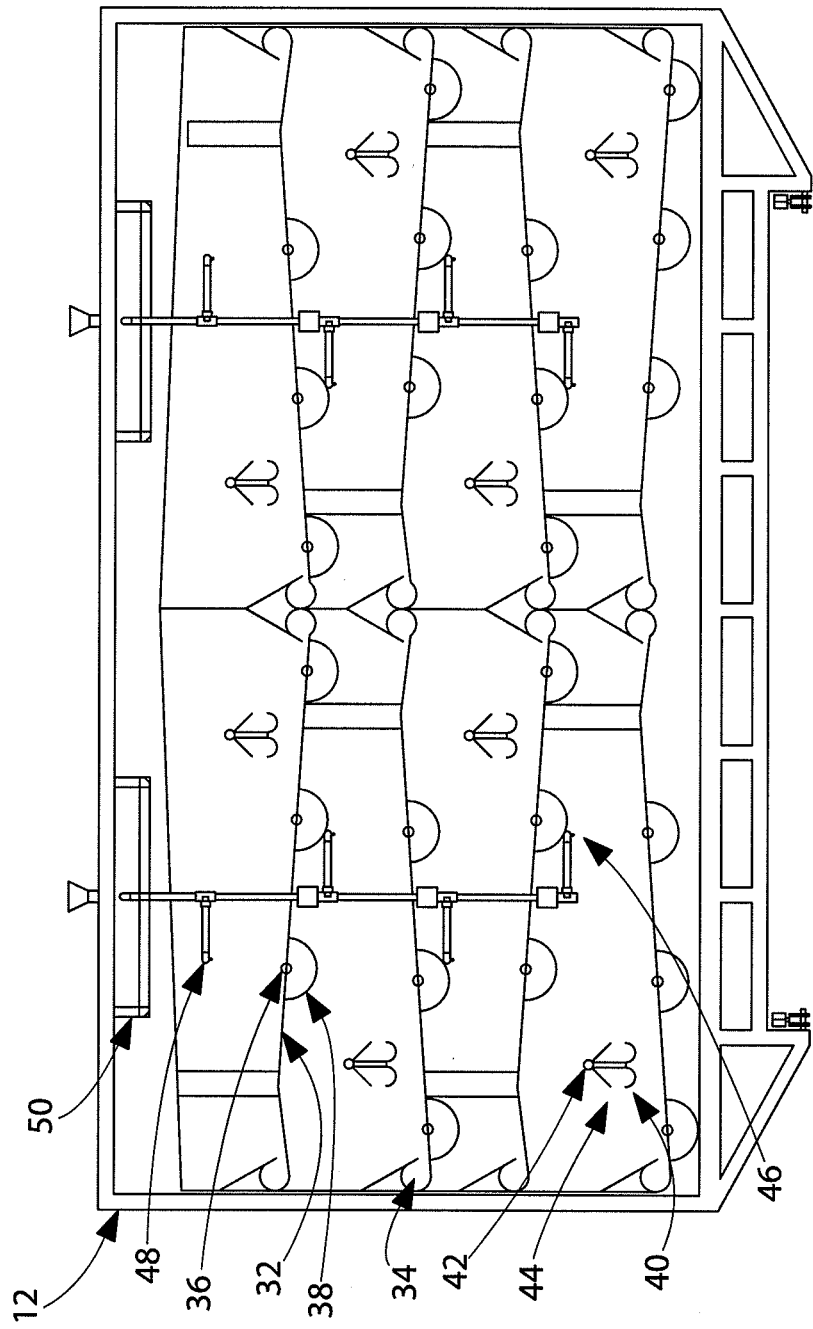
FIG. 4A is a vertical sectional view of an exemplary module of Applicant's system.

The construction of each module 12 includes several features that aid the functional efficiency of the system and several features that improve the comfort of the birds or aid in the ability of the birds to express natural behaviors. For example, as shown in FIG. 4A, a typical module 12 preferably includes several levels for housing the birds. These levels have sloped floors 32 to aid in the movement of eggs to accumulation areas 34 and in the movement of waste products (such as manure) to areas of the floor with openings 36. Trays 38 are provided under the floor openings 36 to collect waste for removal. Feed is provided in troughs 40 that have perches 42 above. Shields 44 are provided to prevent waste products from entering the troughs 40. Water is delivered to the birds by nipple drinkers 46 spaced along pipes 48. Water is stored in reservoir 50 to assure an adequate supply during the circuit of the module 12 around the system.

Figure 4B:
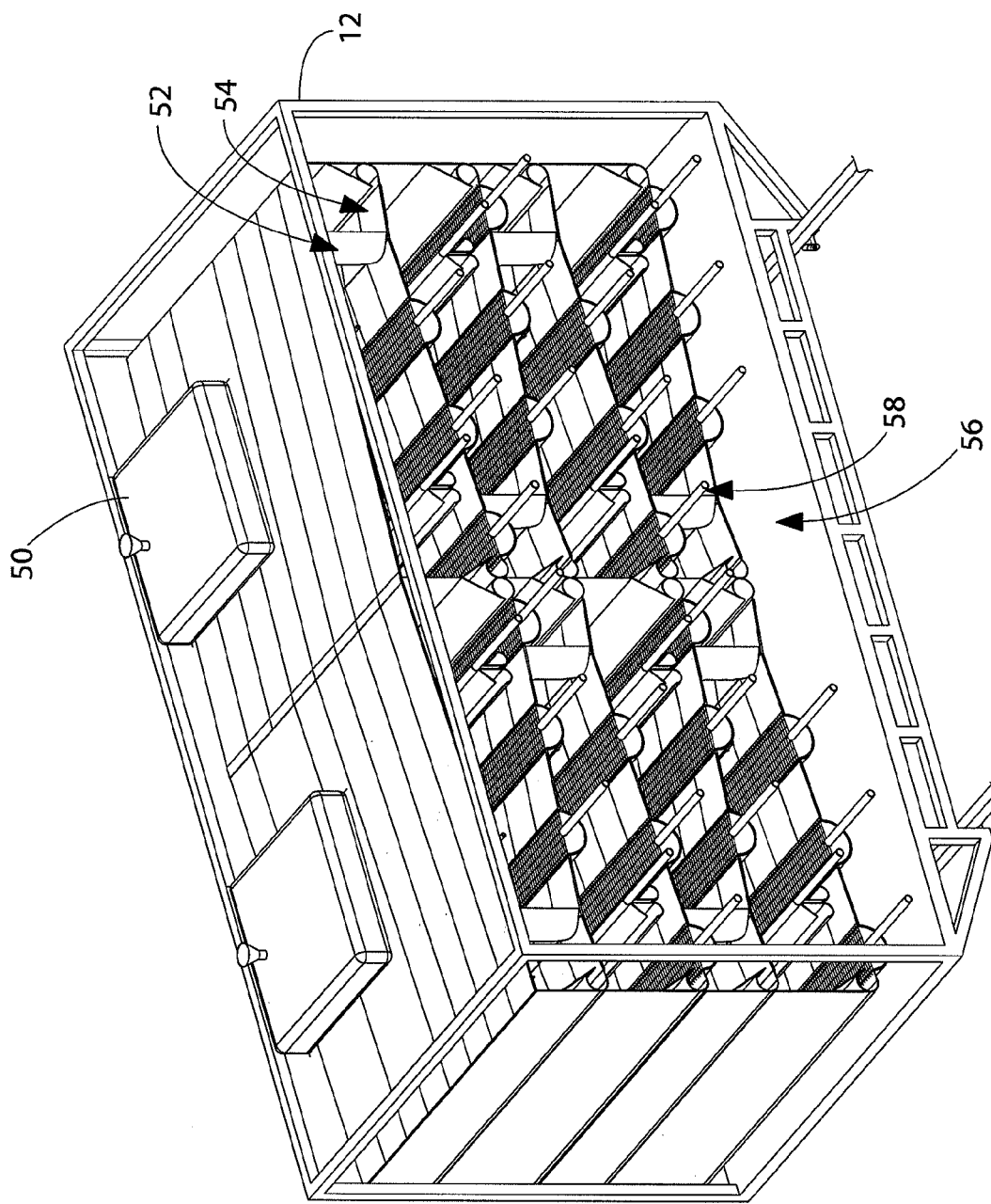
FIG. 4B is an isometric view of the module shown in FIG. 4A.

Areas are provided within the module 12 for egg laying. This area is enclosed by a flexible curtain 52 and utilizes a mat 54 on the floor for comfort, as shown in FIG. 4B. A scratch area is provided beyond the feed trough 40 so that feed can spill out of the end of the trough 40, if desired, for scratch material. Although one embodiment is constructed so that birds on any given level remain on that level, an additional embodiment provides an area 56 of the module 12 that allows birds to traverse from one level to another or sit on perches 58 at various levels within the module 12. FIG. 4A, FIG. 4B, and subsequent figures show the modules 12 with enclosing panels of mesh wire or plastic removed for clear viewing of the construction details.

Figure 5A:
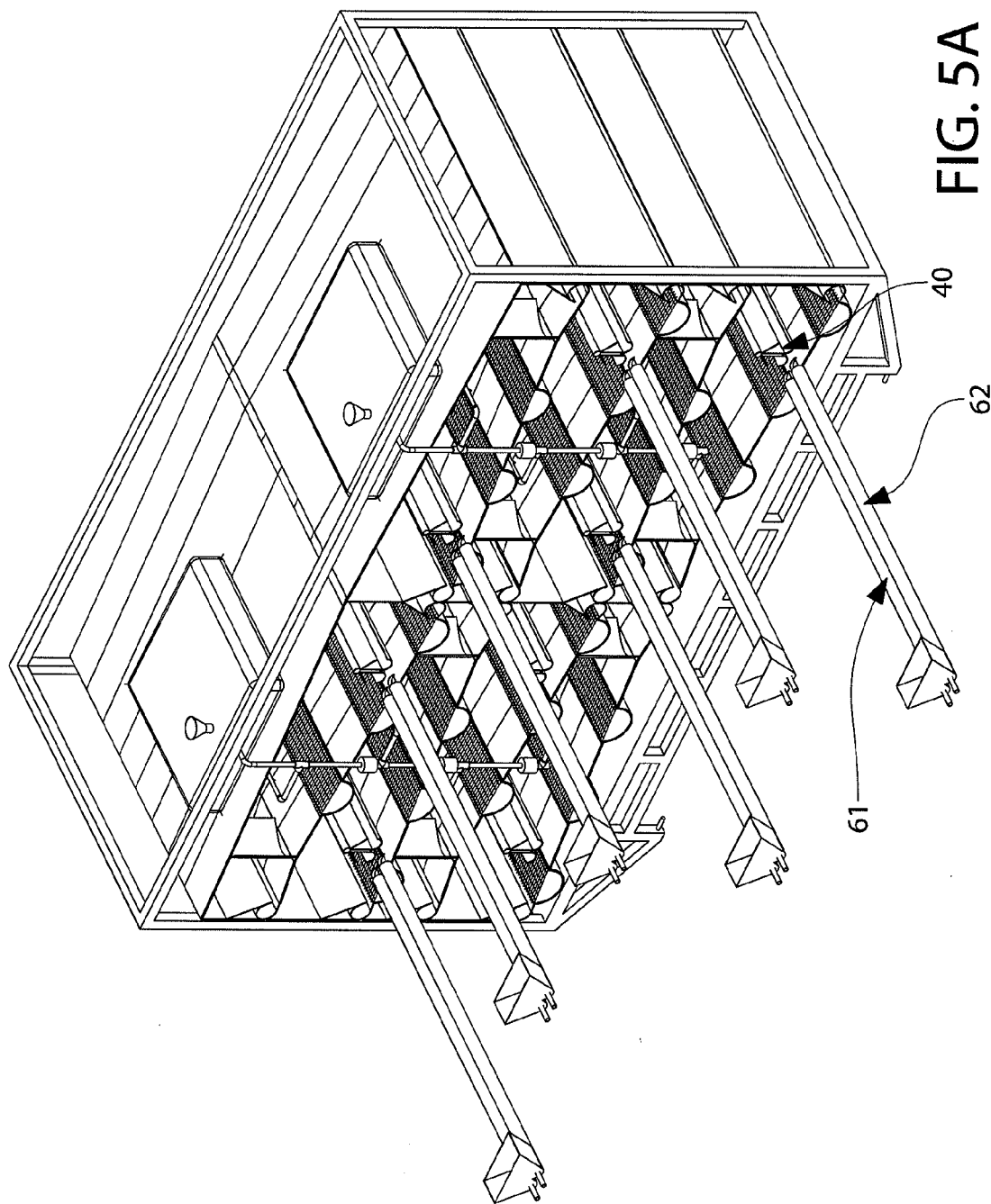
FIG. 5A is an isometric view of an exemplary module of Applicant's system shown at a provision supply station forming a portion of the system for providing animals in the module with provisions.
Figure 5B:
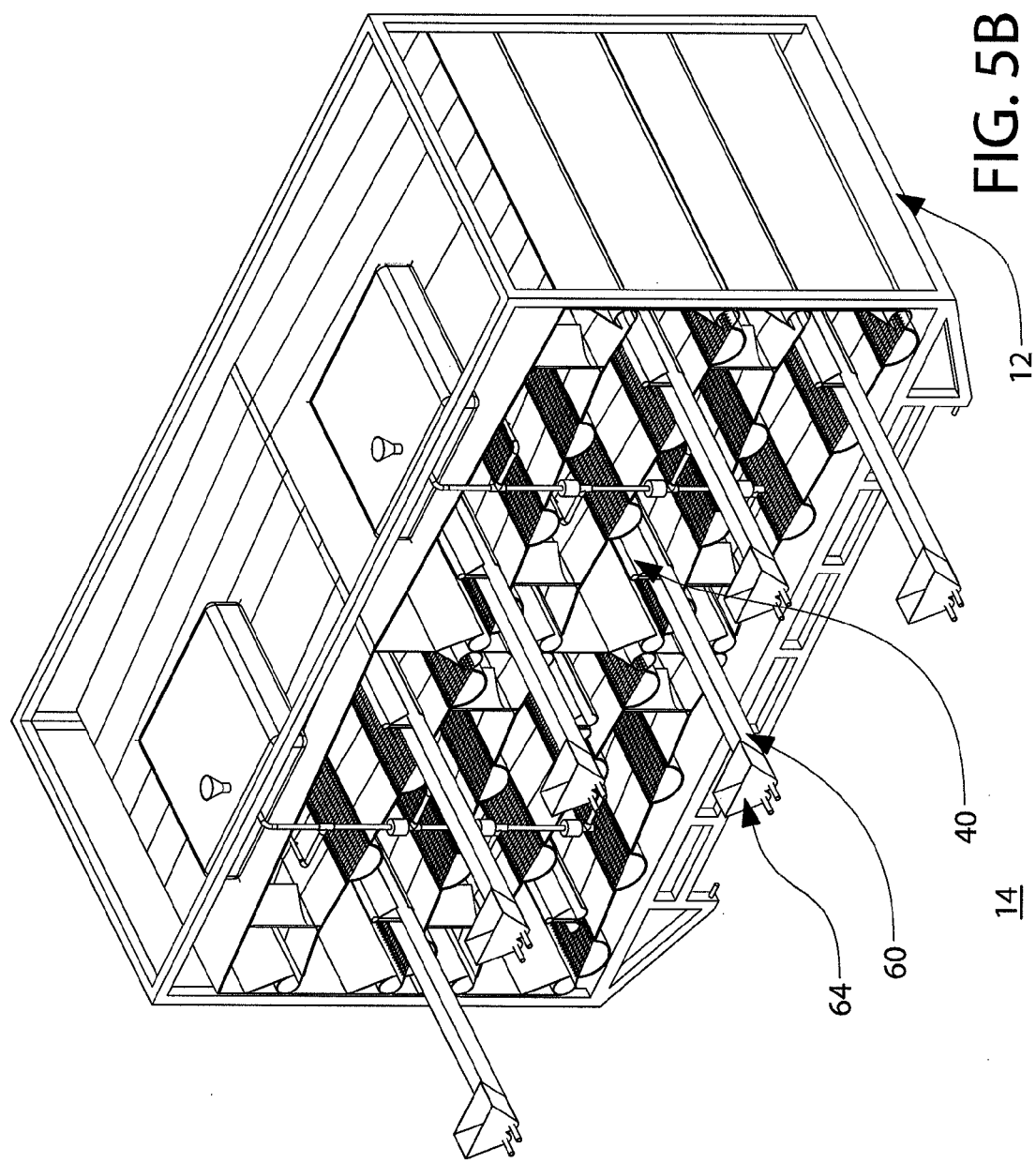
FIG. 5B is another view of a module similar to the module shown in FIG. 5A.

As best seen in FIGS. 5A and 5B the supply of provisions, such as feed, is accomplished through the use of troughs 40 filled at the provision supply station 14. When the module 12 is moved into position at the provision supply station 14, a group of augers 60 at the station begin to rotate about their individual axes. Each auger's axis (61, 62, etc.) is aligned with the axis of an associated trough 40. The group of augers 60 is moved parallel to the axes of the troughs 40 in a manner that causes the augers 60 to enter the troughs 40. The rotation of the augers 60 causes any feed remaining in the troughs 40 to be removed and deposited in the hoppers 64. The hoppers 64 are equipped with weighing devices that allow measurement of the amount of feed removed from the troughs 40. The amount of uneaten feed can be recorded and also used for calculation by the feed controller to determine how much feed should be added to the hoppers 64 to supply the module 12 until it returns to the provision supply station 14 again. The weight of feed added to the hoppers 64 will equal the weight of feed eaten by the birds since the last replenishment. Feed usage can be measured and recorded for the entire module 12 or for each individual level within the module 12. After the troughs 40 have been emptied into the hoppers 64, the augers 60 cease rotation, weighing takes place, feed is added to the hoppers 64 by standard feed delivery systems in an amount directed by the feed controller, and the augers 60 begin rotation in the opposite direction. This opposite rotation causes the feed from the hoppers 64 to be moved into the troughs 40. Various loading of the troughs 40 can be necessary depending on the needs of the birds. This variation in loading or filling of the troughs 40 is accomplished by varying the opening to the augers 60 at the bottom of the hoppers 64, thus varying the quantity of feed carried by the augers 60. When the appropriate amount of feed has been removed from the hoppers 64, the augers 60 have feed distributed internally along their length and the augers 60 cease rotation. If desired, the augers 60 can continue to rotate long enough to expel some feed beyond the end of the troughs 40 to be used for scratch material, as described earlier. As the group of augers 60 is moved parallel to the axes of the troughs 40 in a direction to cause the augers 60 to exit the troughs 40, the augers 60 rotate at a speed synchronous with the exiting motion. This synchronous rotation allows the augers 60 to be withdrawn without moving the feed along the axes of the troughs 40 in either direction. After the augers 60 are fully withdrawn, the module 12 can move away from the provision supply station 14. When the next module 12 is moved into position at the provision supply station 14, the cycle repeats.

Alternatively, the supply of provisions, such as feed, could be accomplished through the use of troughs filled by hoppers that supply each level's trough. The hoppers can be filled at the designated supply point(s) located at one or more positions along the travel path of the modules. As the birds eat from the troughs during the movement of the modules around the housing building, the feed that has been eaten is replaced with fresh feed from the hoppers. The feed needed to replenish the hopper (and therefore the amount eaten by the birds) can be measured and recorded by the system's controller each time the hopper is refilled. As another alternative, feeders with self-contained hoppers, or specially designed feeders that allow for periodical loading of feed and dispensing over a period of time to the animals could be used. Feeders could be specially mounted to allow weighing or feed level sensing prior to and after filling to determine feed usage. A sensing device at the fill location could be used to determine weight or feed level and therefore usage.

Figure 6:
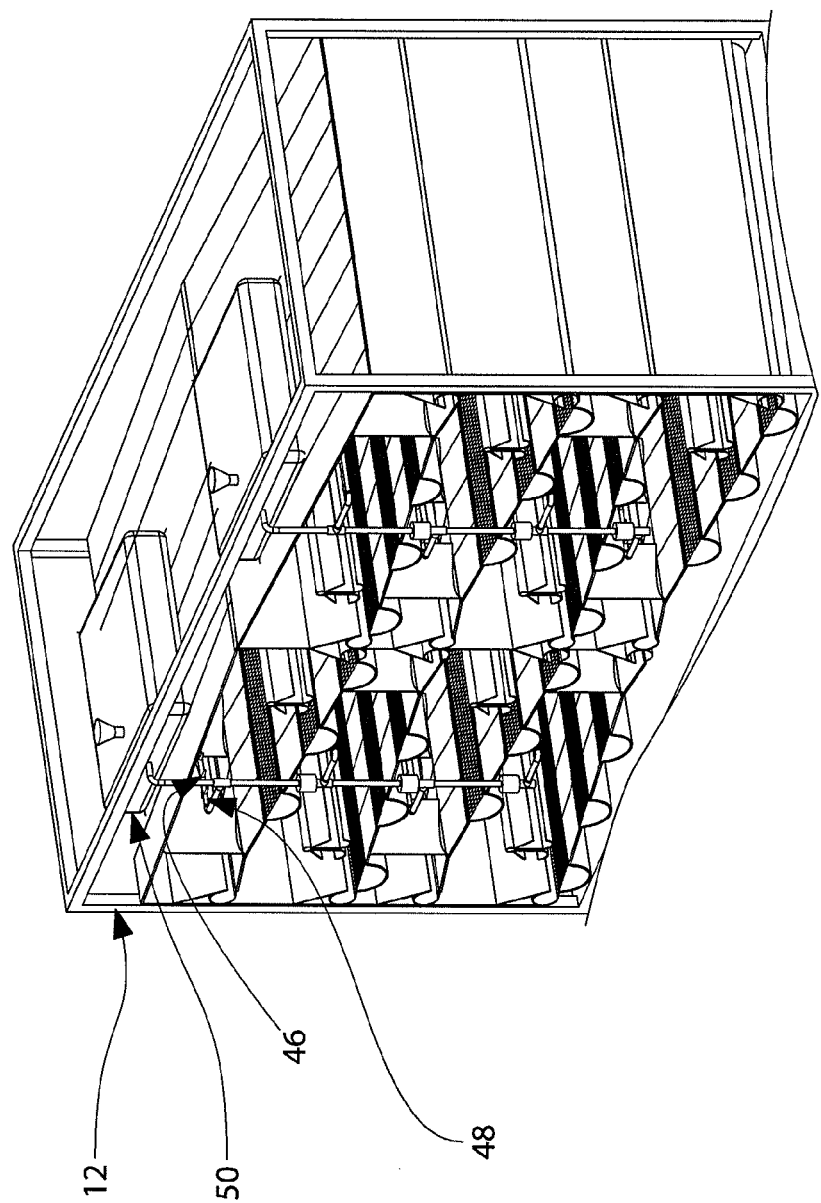
FIG. 6 is an isometric view of a module of Applicant's system showing the details of a means for supplying water to the animals in the module.

FIG. 6 shows the manner in which the birds are supplied with water in the illustrated embodiment. In particular, the supply of water is accomplished through the use of nipple drinkers 46 spaced along a water supply pipe 48 inside the module 12. The supply of water to the pipes 48 is by means of a water holding reservoir 50 that has a wide aspect ratio. That is, a reservoir that is not vertically deep in comparison to at least one of its horizontal dimensions. The reservoir 50 is located on the module at the desired height above the water supply pipe 48 and nipples 46 to provide the desired "head" or water pressure at the nipples 46 to achieve the proper flow rate. This aspect ratio allows only a relatively small change in the water level in the reservoir 50 during the time the module 12 is circulating, and therefore allows only a relatively small change in the pressure at the nipples 46 as the water is consumed and replenished from the reservoir 50. Water usage is determined by measuring the water added to the reservoir 50 on each circuit of the modules 12 around the building or by sensing the water level prior to and after filling. Water usage can be measured and recorded for the entire module 12 or for each individual level within the module 12. Any water additives necessary can be added to the water reservoir 50 at the proper dosage at the time of re-filling. Alternatively, troughs or other watering equipment could be utilized to deliver water to the birds.

Figure 7:
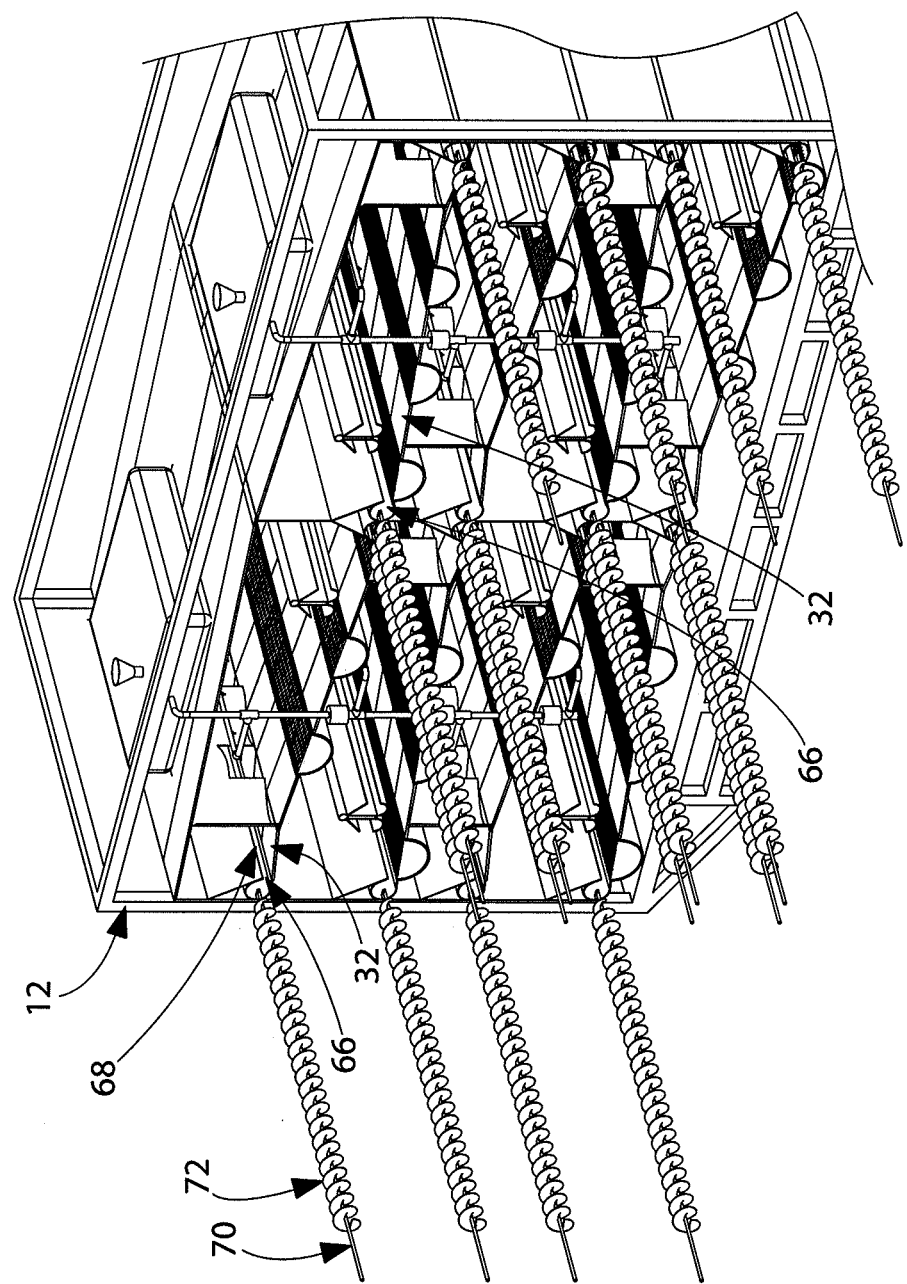
FIG. 7 is an isometric view of a module of Applicant's system shown at an egg removal station forming a portion of the system for effecting the removal of eggs produced by chickens in the module.

FIG. 7 shows the use of the system for the production of eggs by the birds in the module 12. Thus, when the modules 12 are used for the production of eggs, the collection of eggs is accomplished through the use of accumulation areas 66 within the module 12. Gravity moves the eggs to the accumulation areas 66 as they roll along sloped floors 32 within the module 12. The egg accumulation areas 66 are protected by shields 68 to prevent damage to the eggs by the birds. When the module 12 arrives at the designated egg removal station 14, augers 70 with flexible flighting 72 extend from that station into the accumulation areas 66. The augers 70 rotate about their individual axes at a synchronous speed as they extend so that the fighting 72 moves between eggs in the accumulation areas 66 but does not move them axially. When the augers 70 are fully extended into the accumulation areas 66, they continue to rotate and begin to move the eggs axially out of the accumulation areas 66. As the eggs leave the accumulation areas 66, they can be deposited at each tier into vertical egg collectors (currently available devices) and deposited by the vertical egg collector onto a cross conveyor for removal from the housing building to a central location for further processing. Alternatively, when the modules 12 are used for the production of eggs, the collection of eggs can be accomplished through the use of an accumulation area within the module 12. In such a case gravity moves the eggs to the accumulation area 66 as they roll along a sloped floor 32 within the module 12. The egg accumulation area can be protected to prevent damage to the eggs by the birds. When the module 12 arrives at the designated egg removal station 14, a mechanical device for egg collection extends into the accumulation area and gently curved fingers rotate to move under the eggs. As the mechanical device retracts, the eggs move with it because they are now supported and restrained by the curved fingers. After retraction, the eggs can be removed from the egg collection device by reverse rotation of the curved fingers, by tilting and gravity, or by a secondary mechanical device.

As another alternative, for those cases when the modules 12 are used for the production of eggs, the collection of eggs can be accomplished through the use of an accumulation area 66 within the module 12. In such a case gravity moves the eggs to the accumulation area 66 as they roll along a sloped floor 32. As the eggs enter the accumulation area 66, they are guided by a curved curb that rotates the eggs 90 degrees about a vertical axis as they roll. When the module 12 arrives at the designated egg removal area, the module 12 is tilted so that the eggs roll out of the accumulation area 66 by gravity to a collection device. As another alternative, a mechanical device could move the eggs from the accumulation area 66 to the collection device. Still another alternative would be for the accumulation area 66 to have a sloped floor 32 with a gate that holds the eggs from rolling out while the module 12 moved around the building. The gate would be opened when the module 12 arrives at the designated egg removal area and the eggs would roll out of the accumulation area 66 by gravity rather than by tilting of the module 12.

In the one embodiment, when the modules 12 are used for the production of birds for meat, the collection of the birds at the proper time is accomplished at the designated removal station 14 by an automatic mechanical device that gently pushes the birds toward an exit panel or door in the module. Alternatively, human labor can be used to collect the birds.

Figure 8:
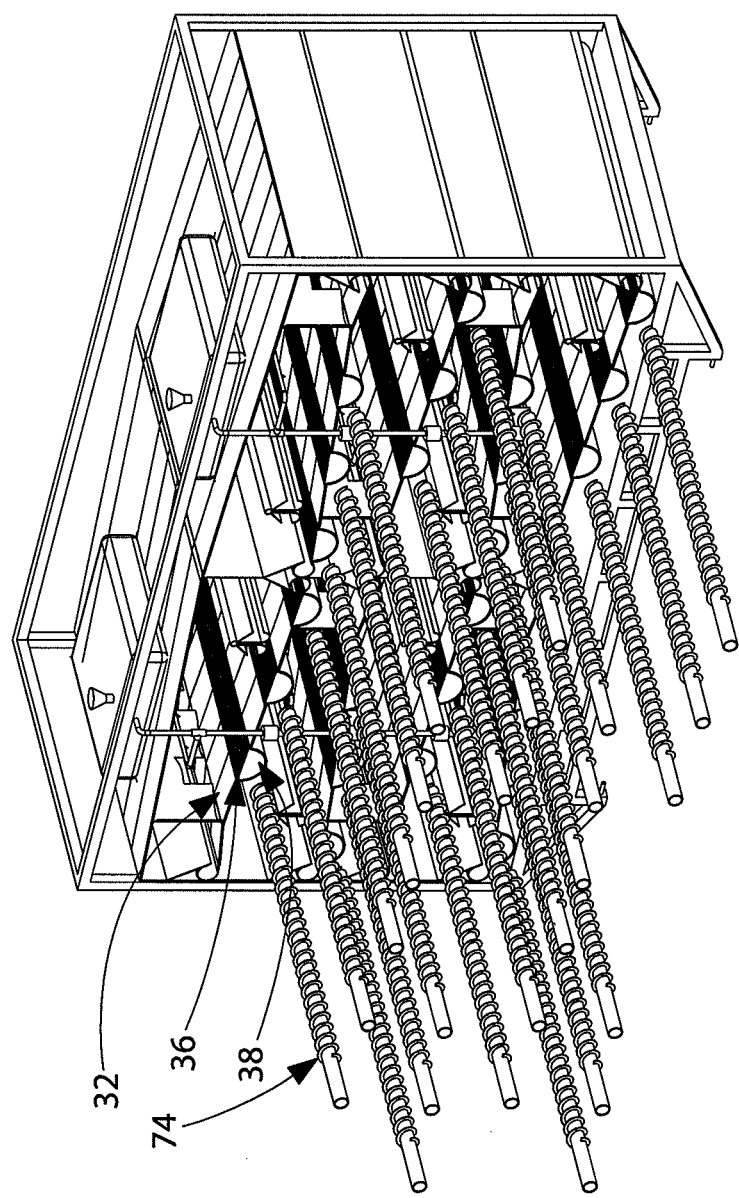
FIG. 8 is an isometric view of a module of Applicant's system shown at a waste removal station forming a portion of the system for effecting the removal of waste produced by animals in the module.

The manner of removal of waste products from the modules 12 is best seen in FIG. 8. To that end, in the illustrated embodiment, waste products (such as manure) are moved by the foot action of the birds downward on the sloped floors 32 to areas of the floors 36 that have openings large enough for the waste to drop through, but not large enough for the birds feet to fit through or become entangled. The waste drops through the floor openings 36 into receiving trays 38 that accumulate the waste for removal from the module 12 at a designated area by means of augers 74. The augers 74 rotate as they extend into the receiving trays 38 and continue to rotate for a period of time when fully extended. This rotation causes the waste to be removed from the receiving trays 38. The waste can be deposited by the augers 74 into a conveyor or a drying or storage area. Alternatively, the waste could be removed by a stationary device that scrapes, pushes, vacuums, blows, or uses other means to remove the waste from the module 12 as the module 12 is moving past the designated area. Between waste removals, the waste could be allowed to collect on the floor of the module, or the floor could be constructed with openings so that the waste passes through the animal support surface to a lower surface. The lower surface could then be cleaned as described.

In the illustrated embodiment of the system, a mechanical device (not shown) is provided to push dead birds from the module 12. The device pushes rods or a scraper across the floor of each level so the rods or scraper push any dead birds across the floor and out of the module 12. Live birds would simply step over the rods or scraper as it passed by. This device could also serve to remove waste products (e.g., manure) from the floor, with the dead birds being separated from the waste in a secondary operation. Alternatively, a separate device could be used to remove dead animals automatically at a designated location.

The same device used to remove waste and/or dead animals can be used to automatically remove healthy animals from the module 12 for any purpose including marketing or special care. Thus, the device can have a modified setting or include more rods to change between functions. Alternatively, a separate device could be located at a designated location and used to automatically remove healthy animals from the module 12 for any purpose.

The modules 12 can be identified by means of a bar code, an RFID tag, or other marking device to allow identification upon arrival at designated locations/stations throughout the housing building. Modules 12 can also be identified by having the system's controller keep a count of modules 12 passing a single point along the path of the module 12. This marking or counting allows the automatic tracking of provision usage, product production level, animal weight, and other data on an individual module 12 or module level basis. Sensors could be mounted at designated locations to gather tracking information, transmitting it to the controller for data storage and analysis. Data can be collected for storage and analysis from the provision and collection equipment and correlated with a specific module 12 or modules based on an identification tag or module count as modules 12 move into position for provision supply or product removal.

Persons skilled in the art will recognize that many other embodiments incorporating Applicant's inventive concepts are possible, as well as many variations of the embodiments illustrated and described herein. Two variations are discussed below.

In one variation, the modules 12 could be constructed without a full enclosure (such as wire mesh) such that the animals could move from module 12 to module 12 along the length of the building. This would give additional freedom of movement to the animals while maintaining the ability to supply provisions (feed and water) and remove products and/or waste products at discrete locations 14.

It is possible to build the system 10 described above, but without wire mesh, plastic mesh, or other means enclosing the modules 12 to keep the animals in the modules 12. The modules 12 could move along stationary enclosing panels that served to keep the animals excluded from certain areas of the building but allowed movement from module 12 to module 12. This is one embodiment for chickens grown for meat production.

Another variation is that when the first transporter is transporting at least part of the series of modules 12 in a first direction, it may, by virtue of each module 12 pushing the adjacent module 12 along ahead of it, transport a module 12 into a position adjacent to a station 14 before the second transporter moves the module 12 at all. For example, the first transporter pushes the whole row of modules 12 down the length of the building and the module 12 at the far end of the row gets pushed onto the second transporter and is also now adjacent to a station 14. So even before the second transporter moves the module 12 at all, it is in position adjacent to a station 14, ready for the station 14 to do its work. The second transporter would still be necessary to move the module 12 into position adjacent to other stations 14 and to get the module 12 moved across the building to be ready for the return trip parallel and in an opposite direction to the movement of the first transporter.

Applicant's systems and methods include many other embodiments and variations thereof which are not illustrated in the drawings or discussed in the Detailed Description section. Those embodiments and variations, however, do fall within the scope of the appended claims and equivalents thereof.

Persons skilled in the art will recognize that the embodiments and variations illustrated in the drawings and discussed in the Detailed Description section do not disclose all of the possible arrangements of Applicant's systems and methods, and that other arrangements are possible. Accordingly, all such other arrangements are contemplated by Applicant's systems and methods, and are within the scope of the appended claims and equivalents thereof.

Although Applicant's systems and methods are discussed herein in connection with poultry, persons skilled in the art will recognize that Applicant's systems and methods also may be used with other types of livestock and animals.

Although illustrated and described herein with reference to certain specific embodiments, Applicant's systems and methods are nevertheless not intended to be limited to the details shown. Rather, various modifications may be made in the details within the scope and range of equivalents of the claims without departing from the spirit of the invention.

What is claimed is:

1. A system for handling a plurality of live animals in a facility, comprising:
   at least one movable linear or curvilinear series of a plurality of movable animal housing modules, at least one of said movable animal housing modules containing and enclosing, at least partially, at least one of the plurality of live animals when the system is and/or will be in operation;
   a plurality of stations at a first location in the facility, at least one of the stations communicating with at least one of the movable animal housing modules positioned adjacent the at least one of the stations when the system is and/or will be in operation, whereby at least one of a food, a supplement, and a fluid for the at least one of the plurality of live animals is automatically dispensed to the at least one of the movable animal housing modules from the at least one of the stations, and/or at least one of a product and a waste from the at least one of the plurality of live animals is automatically collected from the at least one of the movable animal housing modules by the at least one of the stations;
   a first transporter for transporting at least a part of the at least one movable linear or curvilinear series of the plurality of movable animal housing modules in a first direction, the first transporter having transported across it at least one first movable animal housing module in the series of movable animal housing modules from a second location in the facility to a first position between the first location and the second location when the system is and/or will be in operation;
   a second transporter for transporting at least a portion of the at least one movable linear or curvilinear series of the plurality of movable animal housing modules in a second direction, the second transporter having transported across it the at least one first movable animal housing module in the series of movable animal housing modules from the first position to a second position nearer the plurality of stations when the system is and/or will be in operation, whereby at least one of the movable animal housing modules in the series of movable animal housing modules is positioned adjacent the at least one of the stations;
   a source of a first motive force that moves the at least a part of the at least one movable linear or curvilinear series of the movable animal housing modules across the first transporter, whereby at least one of the movable animal housing modules pushes and thereby moves an adjacent movable animal housing module or another movable animal housing module in said at least a part of the at least one movable linear or curvilinear series of the movable animal housing modules when said at least a part of the at least one movable linear or curvilinear series of the movable animal housing modules is moved by the first motive force; and
   a source of a second motive force that moves the at least a portion of the at least one movable linear or curvilinear series of the movable animal housing modules across the second transporter,
   wherein the at least one of said movable animal housing modules includes at least one support comprising at least one movable component selected from a group including at least one wheel, caster, other rolling device, and sliding device, and
   wherein the first transporter is below the at least a part of the at least one movable linear or curvilinear series of the plurality of movable animal housing modules transported in the first direction, and
   wherein the second transporter is below the at least a portion of the at least one movable linear or curvilinear series of the plurality of movable animal housing modules transported in the second direction.

2. The system as in claim 1, wherein the source of the first motive force and the source of the second motive force have a common source of motive force.

3. The system as in claim 1, wherein the source of the first motive force is at least one first reciprocating actuator.

4. The system as in claim 3, wherein the source of the second motive force is at least one second reciprocating actuator.

5. The system as in claim 1, wherein the first transporter comprises at least one first track or first pair of spaced apart tracks.

6. The system as in claim 5, wherein the second transporter comprises at least one second track or second pair of spaced apart tracks.

7. The system as in claim 6, wherein the second transporter comprises at least one other track or other pair of spaced apart tracks positioned at an angle to the at least one second track or second pair of spaced apart tracks.

8. The system as in claim 1, wherein the second transporter comprises a movable reciprocating platform positioned beneath one of the movable animal housing modules being transported across the second transporter when the system is and/or will be in operation.

9. The system as in claim 1, wherein at least some of the movable animal housing modules in the series of the plurality of movable animal housing modules are movably connected by the at least one support to at least one of at least part of the first transporter and at least part of the second transporter.

10. The system as in claim 1, wherein at least one of the movable animal housing modules has multiple levels, each level being vertically spaced apart from an adjacent level.

11. The system as in claim 10, wherein the plurality of live animals includes poultry or other fowl and the at least one of a product collected includes a plurality of eggs from the poultry or other fowl.

12. The system as in claim 1, wherein at least one of the movable animal housing modules includes a fluid supply assembly that provides water or other fluids to the at least one of the plurality of live animals contained and enclosed, at least partially, in the at least one of the movable animal housing modules.

13. The system as in claim 1, wherein at least part of the first transporter is on a floor of the facility.

14. The system as in claim 1, wherein at least part of the first transporter is on or connected to a wall of the facility.

15. The system as in claim 1, wherein at least some of the first motive force is transferred from one of the movable animal housing modules to an adjacent movable animal housing module or another movable animal housing module in the at least one movable linear or curvilinear series of the plurality of movable animal housing modules.

16. The system as in claim 1, wherein at least a portion of the second transporter is common with at least a portion of the first transporter.

17. The system as in claim 1, wherein the plurality of live animals includes poultry or other fowl.

18. A system for handling a plurality of live animals in a facility, comprising:
 a first row of a movable linear series of a plurality of movable animal housing modules at least one of said movable animal housing modules containing and enclosing, at least partially, some of the plurality of live animals in a first plurality of movable animal housing modules in the first row of the movable linear series of the plurality of movable animal housing modules when the system is and/or will be in operation;
 a second row of the movable linear series of the plurality of movable animal housing modules containing and enclosing, at least partially, some other of the plurality of live animals in a second plurality of movable animal housing modules in the second row of the movable linear series of the plurality of movable animal housing modules, the second row being substantially parallel to the first row and each of the first row and the second row having a first end and a second end opposite the first end when the system is and/or will be in operation;
 a plurality of stations at a first location in the facility, at least one of the stations being adjacent the second end of the second row and communicating with at least one of the movable animal housing modules in the movable linear series of the plurality of movable animal housing modules positioned adjacent the at least one of the stations when the system is and/or will be in operation, whereby at least one of a food, a supplement, and a fluid for the at least one of the plurality of live animals is automatically dispensed to the at least one of the movable animal housing modules from the at least one of the stations, and/or at least one of a product and a waste from the at least one of the plurality of live animals is automatically collected from the at least one of the movable animal housing modules by the at least one of the stations;
 a first pair of spaced apart tracks for transporting the first row of the movable linear series of the plurality of movable animal housing modules in a first direction, the first pair of spaced apart tracks having transported across it at least one first movable animal housing module in the series of movable animal housing modules from a second location near the first end of the first row to a first position near the second end of the first row when the system is and/or will be in operation;
 a source of a first motive force that moves the first row of the movable linear series of the plurality of movable animal housing modules across the first pair of spaced apart tracks, whereby at least one of the movable housing modules pushes and thereby moves an adjacent movable housing module or another movable housing module in the first row of the movable linear series of the plurality of movable animal housing modules when the first row of the movable linear series of the plurality of movable animal housing modules is moved by the first motive force;
 a movable platform near the second end of the first row and the second end of the second row, the movable platform positioned beneath and transporting a movable animal housing module at the second end of the first row to the second end of the second row in a second direction substantially perpendicular to the first direction when the system is and/or will be in operation, the movable platform being mounted on a second pair of spaced apart tracks substantially perpendicular to the first pair of spaced apart tracks;
 a source of a second motive force that moves the movable animal housing module on the movable platform from the second end of the first row to the second end of the second row;
 a third pair of spaced apart tracks for transporting the second row of the movable linear series of the plurality of movable animal housing modules in an other direction opposite the first direction, the third pair of spaced apart tracks being substantially parallel to the first pair of spaced apart tracks; and
 a source of a third motive force that moves the second row of the movable linear series of the plurality of movable animal housing modules on the third pair of spaced apart tracks in the other direction opposite the first direction, whereby at least one of the movable housing modules pushes and thereby moves an adjacent movable housing module or another movable housing module in the second row of the movable linear series of the plurality of movable animal housing modules when the second row of the movable linear series of the plurality of movable animal housing modules is moved by the third motive force,
 wherein the at least one of said movable animal housing modules includes at least one support comprising at least one movable component selected from a group including at least one wheel, caster, other rolling device, and sliding device, and
 wherein the first pair of spaced apart tracks is below the first row of the movable linear series of the plurality of movable animal housing modules transported in the first direction, and
 wherein the third pair of spaced apart tracks is below the second row of the movable linear series of the plurality of movable animal housing modules transported in the other direction opposite the first direction.

19. The system as in claim 18, wherein at least some of the movable animal housing modules in the series of the plurality of movable animal housing modules are movably connected by the at least one support to at least one of at least part of the first pair of spaced apart tracks, at least part of the second pair of spaced apart tracks, and at least part of the third pair of spaced apart tracks.

20. The system as in claim 18, wherein at least one of the movable housing modules has multiple levels, each level being vertically spaced apart from an adjacent level.

21. The system as in claim 18, wherein the plurality of live animals includes poultry or other fowl.

22. A method for handling a plurality of live animals in a facility, comprising the steps of:

providing at least one movable linear or curvilinear series of a plurality of movable animal housing modules, at least one of said movable animal housing modules containing and enclosing, at least partially, at least one of the plurality of live animals;

providing a plurality of stations at a first location in the facility, at least one of the stations communicating with at least one of the movable animal housing modules positioned adjacent the at least one of the stations, whereby at least one of a food, a supplement, and a fluid for the at least one of the plurality of live animals is automatically dispensed to the at least one of the movable animal housing modules from the at least one of the stations, and/or at least one of a product and a waste from the at least one of the plurality of live animals is automatically collected from the at least one of the movable animal housing modules by the at least one of the stations;

applying a first motive force to move at least a part of the at least one movable linear or curvilinear series of the plurality of movable animal housing modules across a first transporter, whereby at least one of the movable housing modules pushes and thereby moves an adjacent movable housing module or another movable housing module in said at least a part of the at least one movable linear or curvilinear series of the movable animal housing modules when said at least a part of the at least one movable linear or curvilinear series of the movable housing modules is moved by the first motive force;

transporting across the first transporter the at least a part of the at least one movable linear or curvilinear series of the movable animal housing modules in a first direction, whereby at least one first animal housing module in the at least a part of the at least one movable linear or curvilinear series of the movable animal housing modules is transported from a second location in the facility to a first position between the first location and the second location;

applying a second motive force to move at least a portion of the at least one movable linear or curvilinear series of the movable animal housing modules across a second transporter; and transporting across the second transporter the at least a portion of the at least one movable linear or curvilinear series of the plurality of movable animal housing modules in a second direction, whereby the at least one first animal housing module in the at least a portion of the at least one movable linear or curvilinear series of the movable animal housing modules is transported from the first position to a second position nearer the plurality of stations so that at least one of the movable animal housing modules in the at least one movable linear or curvilinear series of the movable animal housing modules is adjacent at least one of the stations, wherein the at least one of said movable animal housing modules includes at least one support comprising at least one movable component selected from a group including at least one wheel, caster, other rolling device, and sliding device, and wherein the first transporter is below the at least a part of the at least one movable linear or curvilinear series of the plurality of movable animal housing modules transported in the first direction, and wherein the second transporter is below the at least a portion of the at least one movable linear or curvilinear series of the plurality of movable animal housing modules transported in the second direction.

23. The method as in claim 22, wherein at least some of the movable animal housing modules in the series of the plurality of movable animal housing modules are movably connected by the at least one support to at least one of at least part of the first transporter and at least part of the second transporter.

24. The method as in claim 22, wherein at least one of the movable housing modules has multiple levels, each level being vertically spaced apart from an adjacent level.

25. The method as in claim 22, wherein the plurality of live animals includes poultry or other fowl.

* * * * *